Jan. 10, 1939.  F. T. AGRICOLA  2,143,640
COOKING RANGE OR STOVE
Filed May 27, 1937  2 Sheets-Sheet 1
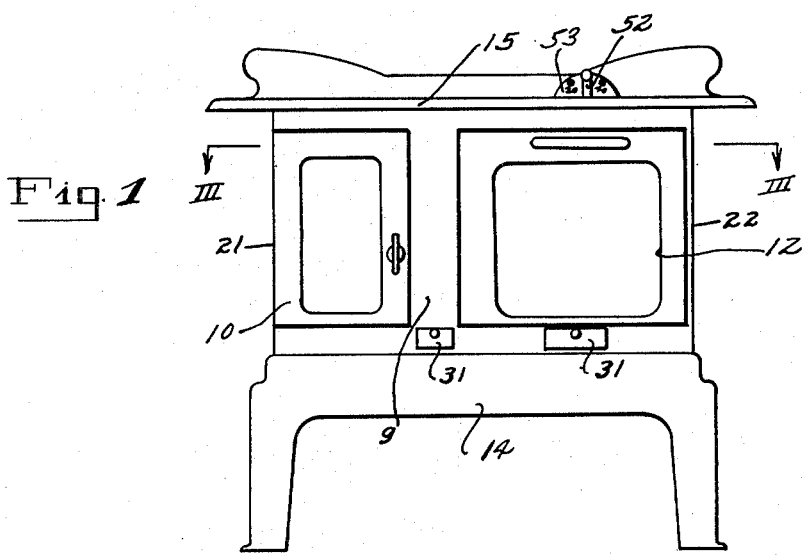
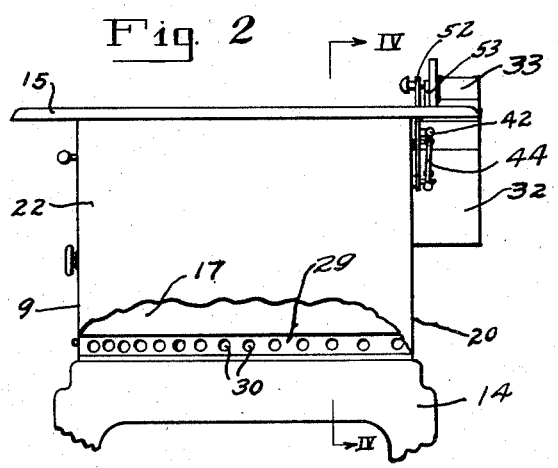
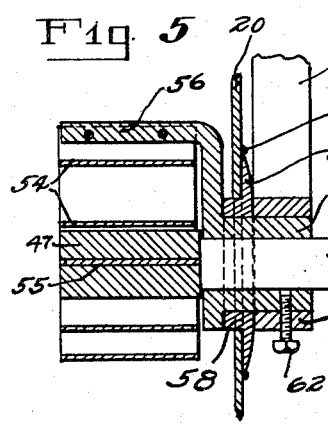
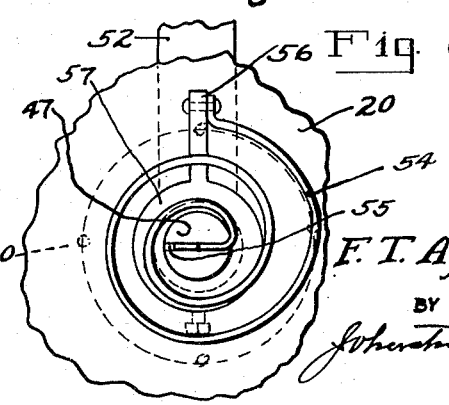
INVENTOR
F. T. Agricola
BY
Johnston Jennings
ATTORNEYS

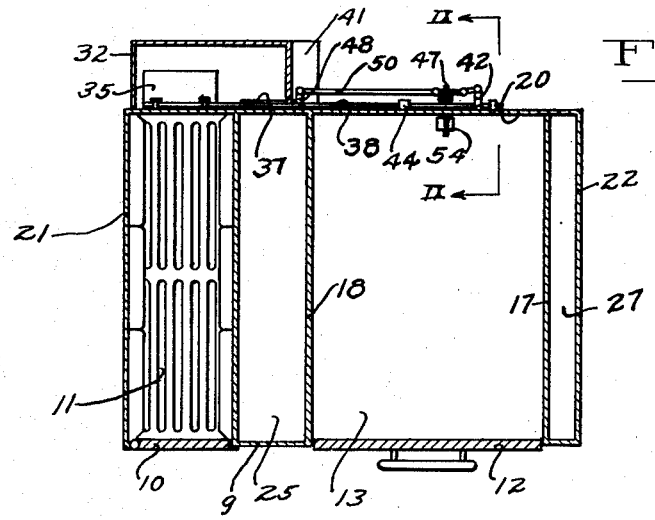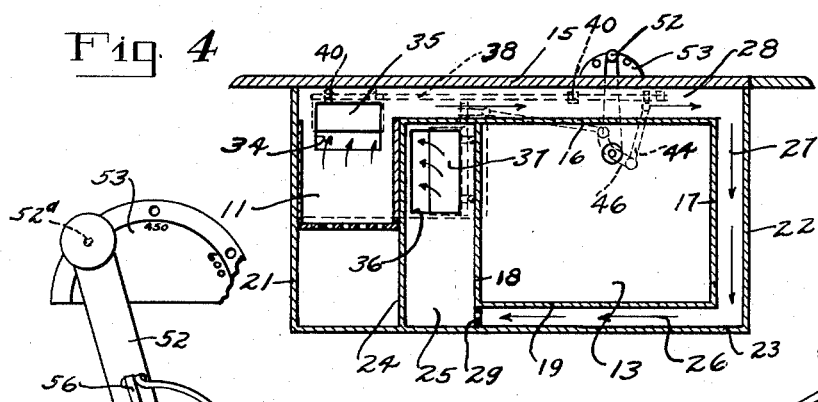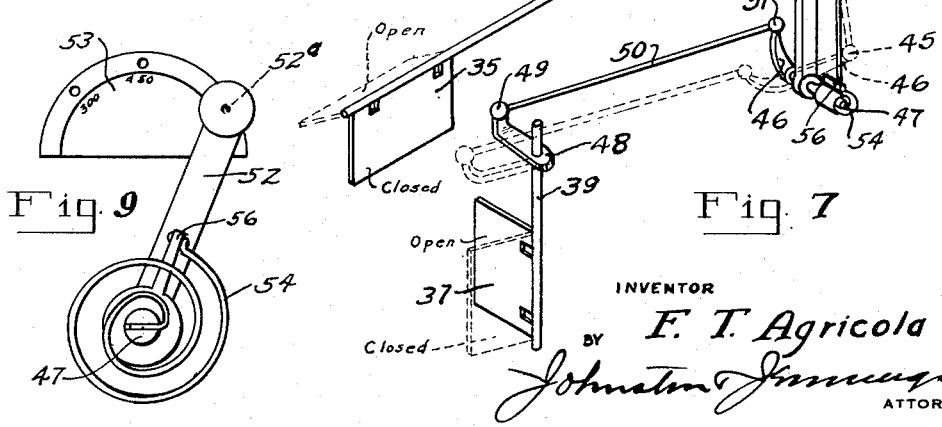

Patented Jan. 10, 1939

2,143,640

UNITED STATES PATENT OFFICE 2,143,640

COOKING RANGE OR STOVE

Frederick T. Agricola, Gadsden, Ala.

Application May 27, 1937, Serial No. 145,010

10 Claims. (Cl. 126—1)

My invention relates to an improved type of cooking range or stove adapted for burning wood, coal and like hard fuel, wherein by means of an automatic damper control the products of combustion are adapted to pass directly from the fire box into the flue back, or to encircle the oven so as to effect the uniform heating thereof before entering the flue back.

My invention is characterized by certain important structural and functional features which in combination provide for the stove a sensitive control of the oven heat; a regulation by means of which the desired heat can be rapidly attained, and reliably maintained, in the oven; a flue space to insulate the oven from the adjacent hot wall of the fire box; a substantially uniform distribution of heat from front to rear of the oven so that cold or highly heated spots are eliminated; an arrangement of the dampers such that the products of combustion can be almost completely shunted away from the oven when it is not in use; and finally a control mechanism for the dampers, preferably thermostatically operated, and adapted to maintain a predetermined temperature within the oven regardless of the variation in the heat generated in the fire box.

My invention contemplates the provision of a flue damper directly opposite the fire box and an oven heat-controlled damper in a flue between the oven and the fire box, a baffle being provided in the flue under the oven and adapted to insure a substantially uniform flow of the products of combustion from front to rear of the oven.

My invention further comprises a common control for both dampers whereby as one is opened the other is closed and the regulation of the oven heat is effected without interference with the requisite draft to the fire box.

My invention further contemplates forming the baffle under the oven with a series of openings so arranged that they force a substantially uniform flow of the products of combustion through the flue under the oven before they gain access to the flue between the oven and the fire box.

My invention further comprises the novel details of construction and arrangements of parts which, in their preferred embodiments only, are illustrated in the accompanying drawings and are hereinafter more particularly described and claimed.

In the drawings:—

Fig. 1 is a front view of a typical wood or coal stove embodying my invention.

Fig. 2 is an end view of Fig. 1 with the end wall broken away to show the flue under the oven and the baffle therein for distributing the heat uniformly under the oven.

Fig. 3 is a horizontal sectional view taken on the line III—III of Fig. 1 showing the dampers in position with the heat cut off from the oven.

Fig. 4 is a cross sectional view taken on the line IV—IV of Fig. 2, showing both dampers partly open.

Fig. 5 is an enlarged vertical cross sectional view of a thermostatic control element for use in the oven to regulate automatically the temperature therein.

Fig. 6 is an end view of Fig. 5.

Fig. 7 is a detail perspective view showing the damper controls in full lines as they appear with the flue damper closed and the oven heat control damper open to shunt the products of combustion about the oven before they enter the flue back.

Figs. 8 and 9 are detail views of the heat regulating arm set in different operating positions.

Similar reference numerals refer to similar parts throughout the drawings.

In the embodiment of my invention illustrated, I show conventionally a coal or wood cooking stove having in its front wall 9 a door 10 giving access to the fire box 11 and its ash pit; a door 12 giving access to the oven 13; a base 14 and a top 15. It is understood that the design of the stove is not of material importance as the parts described may vary in their shape and in the material employed for their manufacture.

The oven 13 is defined by a top wall 16, end walls 17 and 18, and a bottom wall 19, all of which extend from the front 9 to the back 20. This back 20 connects to the sides 21 and 22 and to the bottom 23 of the stove body. It will be noted that the oven is spaced from the top 15, side 22 and bottom 23 of the stove and from the vertical partition wall 24. This wall 24 separates the fire box and ash pit from the main body of the stove being connected below to the bottom 23 and above to an extension of the oven top 16 so as to define a vertical flue 25 between the oven and the fire box which is closed overhead.

When the oven is in use the products of combustion flow from the fire box through the top flue 28 above the oven, and down flue 27 and along under the oven through flue 26 and enter the bottom of flue 25 through a distributing baffle 29 preferably located in line with the oven wall 18.

As shown more clearly in Fig. 2, this baffle 29 is formed with a series of holes 30 therein, which is typical of any such arrangement of holes or apertures therein as will have the effect of increasing the area available for the flow of the products of combustion toward the front of the stove, thereby tending to force the products of combustion flowing from flue 27 into the flue 26 to bank up therein sufficiently to overcome the tendency to an unbalanced flow under the oven which would unevenly heat it from front to rear. I provide clean-out doors 31 in the front opposite the flue 22 under the oven and the flue 25 so that both flues may be kept clean.

On the back of the stove, opposite the fire box I provide a flue back 32 which communicates overhead with the lead-out 33 to which the flue pipe of the stove will be connected. This flue back is adapted to receive the products of combustion, either directly from the fire box 11 through the opening 34 under control of the flue damper 35, or, after such products of combustion have encircled the oven, through an opening 36 in the upper portion of the back wall of flue 25, under control of the oven control damper 37, or part of the products of combustion may pass directly into the flue back and part around the oven, according to the setting of the dampers 35 and 37.

The flue damper 35 is fast on a horizontal hinge rod 38 journalled in strap hinges 40 on the stove back above opening 34. The oven control damper 37 is fast on a vertical hinge rod 39, journalled in the top and bottom walls of the flue back offset 41. The hinge rod 38 extends across the stove, as a torque rod, with a crank 42 connected to the right hand end of the double crank 46, fast in the rear end of the control shaft 47, by the operating rod 44 through ball joints 43 and 45.

The upper end of the hinge rod 39 has a crank 48 thereon connected by a ball joint 49 to an operating rod 50, in turn connected by a ball joint 51 to the left hand end of the double crank 46. The relation of the double crank 46, rods 44 and 50, and cranks 46 and 48 is such that when the control shaft 47 is turned to rock the double crank 46 in a counterclockwise direction, as viewed in Figs. 4 and 7, the rod 44 will rise and rock damper 35 towards its open position, shown in dotted lines Fig. 7, and at the same time rod 50 will shift to the left and rock damper 37 towards its closed position, shown in dotted lines, Fig. 7. When the control shaft 47 is operated to rock the double crank in a clockwise direction, the two dampers will be reversely moved, so that damper 35 is moved back towards its closed position and damper 37 towards its open position. Thus, it will be seen that as either damper is opened the other is proportionately closed, both movements being positively and simultaneously effected and the damper operation being such that at all times a substantially constant draft is provided for the fire box which is ample for its purposes.

In its broadest aspect, my invention contemplates that the control shaft may be operated either manually or automatically. Referring first to the operation as manual, it is effected by means of an oven temperature control arm 52 which has at its lower end a hub 61 mounted on a sleeve 57 which surrounds shaft 47. Both hub and sleeve can be operatively connected to the shaft 47 by causing the set screw 62 (Fig. 5) to engage shaft 47. With this direct connection, when the arm is swung to set it with relation to its temperature indicator plate 53, mounted on the stove top 15, it will set the double crank 46 and the dampers in the desired relation to provide in the oven the temperature indicated on plate 53. The arm 52 projects through a slot in the top 15 where it may be conveniently operated from the front of the stove and its pin 52a sprung into engagement in any desired hole in the plate 53. The index plate is suitably marked for temperatures and may be provided with any desired means for locking the arm 52 in any desired set adjustment. The arm 52 when rocked to its extreme position, Fig. 8, will set the double crank 46 so that the dampers will cause all of the products of combustion to pass directly from the fire box into the flue back, and when rocked to its extreme position shown in Fig. 9, it will set the dampers to cause all of the products of combustion to encircle the oven. Its intermediate adjustments will allow such portion of the products of combustion to encircle the oven as will maintain the desired oven temperature. Throughout all positions of the double crank 46, one damper will be as much open as the other is closed, and the openings in the flue back which these dampers control are of such cross sectional area that they will permit of the requisite draft being provided for the fire box regardless of the damper setting.

When the dampers are set for the direct delivery of the products of combustion through opening 34 into the flue back, the shunting of all products of combustion directly into the flue back, taken together with the insulating effect of the flue space 25 interposed between the oven and the fire box, will keep the oven substantially cool until the dampers are changed so that more and more of the products of combustion are diverted about the oven and through the opening 36 into the flue back, thereby raising the oven temperature. I thus provide a very simple, exact control of oven temperature.

In adapting my invention to provide for automatic control of the dampers, I prefer to utilize a thermostat located within the oven and in Figs. 5 and 6, I show conventionally a thermostat 54 of the coiled type, composed of any suitable material or arrangement, which has its inner end secured in a slot 55 in the enlarged forward end of the control shaft 47, and its outer end made fast to an arm 56 fast on the sleeve 57 in which the control shaft 47 is mounted. This sleeve 57 is journalled in a bearing sleeve 58 which has its flange 59 spot welded as at 60 to the stove back 20.

When a thermostat is used to control the oven temperature, it is necessary to release the direct connection between the control arm 52 and the rocker shaft 47 which is accomplished by running out the set screw 62 until it releases the shaft 47. This will, however, leave the set screw in position to positively connect the arm 52 to the sleeve 57 that carries the arm 56 to which the thermostat is connected. The hub 61 on the arm 52, thus secured, is held in engagement with the bearing 58 and serves as a washer means to hold the damper control bearing parts assembled, as shown in Fig. 5.

The thermostat, as shown in Fig. 6, is coiled in such a direction and is of such character that as it expands, responsive to rising temperature in the oven, it will turn the control shaft 47 counter-clockwise thereby opening damper 35 as it closes damper 37 which reduces the volume of the products of combustion shunted about the oven and counteracts the rising oven temperature. As the oven temperature falls, the thermostat contracts, turns the rocker shaft 37 clockwise, and closes damper 35 as it opens damper 37, thus increasing the percentage of the products of combustion shunted about the oven and counteracting the falling temperature. Thus the thermostat tends to maintain the oven at the temperature for which its control is set.

Since the arm 56 is rigid with the control arm 52 and both 56 and 52 are free of direct connection to rocker shaft 47, it follows that when the control arm 52 is shifted from intermediate position towards the left (see Fig. 8) the coils of the thermostat will be tightened and when the control arm is shifted towards the right (see Fig. 9) the coils of the thermostat will be loosened. With the coils loosened it will be obvious that the thermostat will react more slowly to a temperature raise and thus will permit a higher temperature to be attained and maintained in the oven, and when the coils of the thermostat are tightened it will respond more quickly in its control of shaft 47 and will permit a lower temperature to be attained and maintained in the oven. In its extreme position at the left, as shown in Fig. 8, the coils will be so set that a minimum oven temperature will hold the flue damper 35 wide open and the oven control damper closed tightly. With the control arm set in the extreme position to the right, as shown in Fig. 9, the oven temperature will rise to the highest point contemplated before the thermostat will commence to regulate the dampers 35 and 37, but in all of its adjustments the arm 52 will so control the coiling of the thermostat that it will act automatically, through its control of the dampers, to keep sufficient heat passing around the oven to maintain it at the selected temperature. Obviously the arm 52 must be held against movement so that the expansion and contraction of the thermostat will take effect only on the rocker shaft 47. The arm 52 will have sufficient play to enable its pin 52a to be engaged in the desired hole in plate 53, and the resulting flow of the products of combustion around the oven will be controlled not only as to volume but also they will be forced to flow uniformly from front to rear about the oven so as to heat it uniformly on all sides and maintain its heat under exact control at all times.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In a stove, a fire pot, an oven spaced from said fire pot to define a flue therebetween, a wall closing said flue at the top, walls defining an oven heating flue leading from said fire pot over, then down alongside, and finally along under, said oven into said first mentioned flue, baffling means to produce a flow, substantially uniform from front to rear, of the products of combustion passing under said oven, stack dampers disposed to shut off the outflow of products of combustion in advance of, and after traversing, said oven heating flue, and means for reversely operating said dampers to regulate the volumetric flow of the products of combustion about the oven.

2. A stove or range according to claim 1, in which both dampers are juxtaposed to the fire box of the stove.

3. A stove or range comprising a fire box, an oven, walls defining a flue encircling the oven with the discharge end of the flue interposed between the oven and fire box and closed at the top, a flue back having a damper opening into the fire box and a damper opening into the back end of the flue between the oven and the fire box, and a common control means for reversibly operating said dampers.

4. A stove or range comprising a fire box, an oven spaced from the fire box and having walls defining a flue communicating overhead with the fire box and terminating in a vertical flue interposed between the oven and fire box and closed at the top, a flue damper controlling the direct discharge of the products of combustion to the flue, an oven heat control damper controlling the discharge of the products of combustion after encircling the oven, and a thermostatically operated mechanism to regulate the oven temperature by operating said dampers to open one as it closes the other responsive to temperature changes in the oven.

5. A stove or range according to claim 4, in which the thermostat is adapted to rock a control shaft having a crank, and transmission means to impart the crank motion positively to open one damper proportionately as it positively closes the other damper.

6. A stove or range comprising a fire box, an oven spaced from the fire box, walls defining a flue having its intake end connected at the top with the fire box and encircling the oven with its discharge end interposed between the oven and fire box and closed at the top, a distributor baffle interposed in the path of the products of combustion as they flow under the oven into the discharge end of said flue, there being a ported area in said baffle designed and adapted to maintain substantially uniform from front to rear the flow of such products under the oven, a damper controlling the diversion of the products of combustion from the intake end of said flue, a damper to control the outflow of products from the discharge end of said flue, and means responsive to variations in oven temperature to operate said dampers reversibly to regulate the volumetric flow of the products of combustion about the oven.

7. An automatic oven temperature control means for a cooking stove or range comprising in combination a fire box, an oven surrounded on all sides except front and back by a flue that has connection at one end only to the fire box, a direct outlet for diverting the fire box flame from the oven into a stack flue with a damper for such outlet, an indirect outlet for the fire box flame after it has encircled the oven with a damper for such indirect outlet, means automatically responsive to the oven heat to apportion the flame to said outlet so as to resist a change in oven temperature, and means to set said heat responsive means to maintain a selected oven temperature.

8. An automatic oven temperature control means according to claim 7, in which both flame outlets open into a common flue back and both dampers are fast on hinge pins which project without said flue back and connect to said heat responsive means.

9. In a stove, a fire pot, an oven spaced from said fire pot to define a flue therebetween, a wall closing said flue at the top, walls defining an oven heating flue of substantially uniform width leading from said fire pot over, then down alongside, and finally along under, said oven into said first mentioned flue, baffling means to produce a flow, substantially uniform from front to rear, of the products of combustion passing under said oven, stack dampers disposed to shut off the outflow of products of combustion in advance of, and after traversing, said oven heating flue, and means for reversely operating said dampers to regulate the volumetric flow of the products of combustion about the oven.

10. In a stove, a fire pot, an oven spaced from said fire pot to define a flue therebetween, a wall closing said flue at the top, walls defining an oven heating flue leading from said fire pot over, then down alongside, and finally along under, said oven into said first mentioned flue means to produce a flow, substantially uniform from front to rear, of the products of combustion passing under said oven, stack dampers for the control of flue connections disposed to draw off the products of combustion in advance of, and after traversing, said oven heating flue, and means automatically responsive to variations in oven temperature for reversely operating said dampers to prorate the outflow of said products through said connections thereby to so regulate the volumetric flow of the products of combustion about the oven as to maintain therein a predetermined temperature.

FREDERICK T. AGRICOLA.